Jan. 20, 1959 R. D. SLAYTON ET AL 2,870,254

TELEGRAPH SYSTEM

Filed June 28, 1955 3 Sheets-Sheet 1

INVENTORS
RANSOM D. SLAYTON
RAYMOND R. SMESSAERT
BY Emery Robinson
ATTORNEY

INVENTORS
RANSOM D. SLAYTON
RAYMOND R. SMESSAERT
BY Emery Robinson
ATTORNEY

INVENTORS
RANSOM D. SLAYTON
RAYMOND R. SMESSAERT
BY Emery Robinson
ATTORNEY 2,870,254

TELEGRAPH SYSTEM

Ransom D. Slayton, Lombard, and Raymond R. Smessaert, Chicago, Ill., assignors to Teletype Corporation, Chicago, Ill., a corporation of Delaware Application June 28, 1955, Serial No. 518,526

8 Claims. (Cl. 178—69)

This invention relates to automatic printing telegraph systems and more particularly to means for assuring automatically continuity of telegraph circuit operation.

The principal object of the invention is to provide a monitoring system that provides a constant check of both circuit continuity and functioning of terminal apparatus.

Another object of the invention is to provide a timed interval monitor control system for automatically checking circuit continuity under the control of a test character periodically inserted at the transmitter and deleted at the receiver.

Another object of the invention is to provide in duplex telegraph circuits automatic synchronized timers at both terminals which would transmit and detect idle pattern signals at periodic intervals when the channel is idle.

A further object of the invention is to provide facilities whereby, during the sensing of the pattern at the receiving station, the timer will blind the receiving printer or reperforator so that the pattern character will not be recorded.

A still further object of the invention is to provide a monitoring system which will not change the message character count, or destroy the message intelligence, or show evidence in a message that a check has been made.

Another object of the invention is to provide a circuit assurance system wherein continuity is assured during both idle and busy periods.

Figure 1:
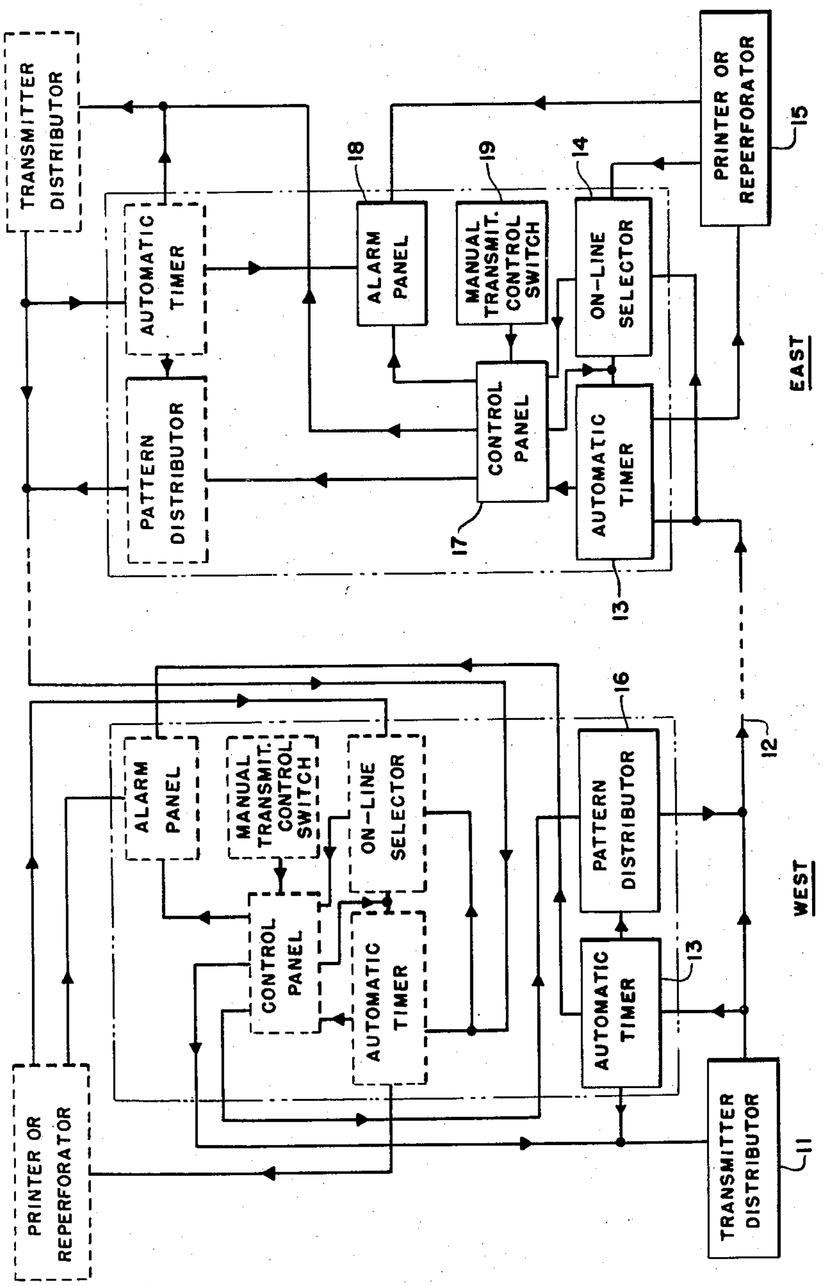
Figure 2:
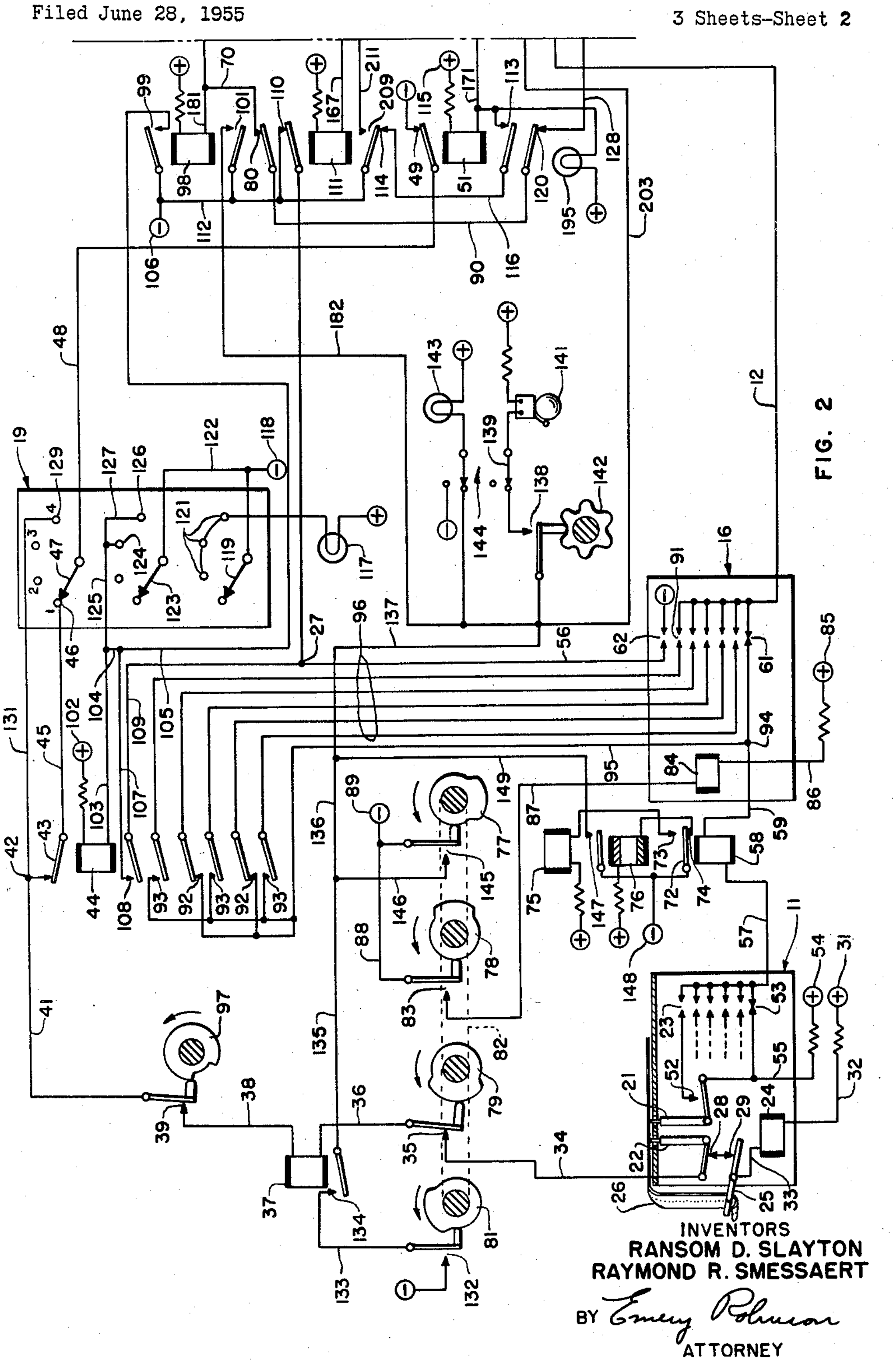
Figure 3:
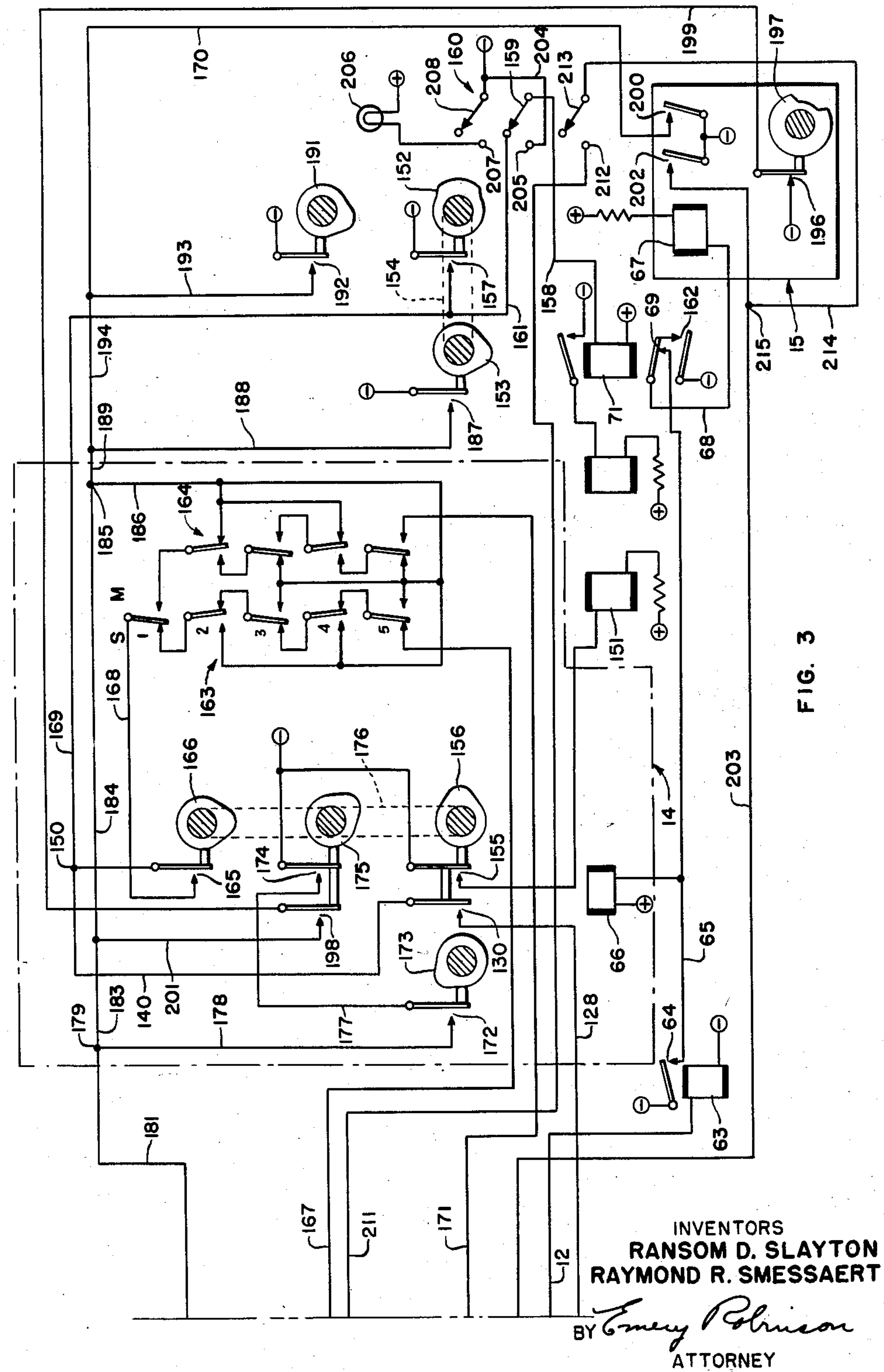

Other objects and features of the invention will be apparent from the following description taken in conjunction with the accompanying drawings, wherein:

Fig. 1 is a schematic representation of the basic system forming the subject matter of the present invention, and Figs. 2 and 3 represent a schematic circuit diagram of the present invention.

Having reference to Fig. 1 of the drawings, each terminal is equipped with units having control over both sending and receiving apparatus. A two-way or full duplex line is contemplated which provides each terminal station with a receiving channel and a transmitting channel over which impulses may be simultaneously transmitted as is the usual practice with full duplex channels and well understood in the art. As shown in Fig. 1, the full duplex channel is illustrated by two full metallic one-way telegraph circuits. This has been done so that the invention may be more readily understood without the further complications of the various types of transmission systems commonly employed in telegraph networks for furnishing full duplex telegraph service between various stations and points. It is to be understood, however, that these lines or circuits may include any of the usual types of transmission circuits capable of providing this type of service. Since these transmission circuits operate in their usual and well-understood manner, they have not been shown in detail. Operation under various conditions is briefly as follows: Under normal transmission conditions, tape is read by the "west" transmitter-distributor 11, thus sending start-stop signals. Appearance of signals on the signal line 12 will keep automatic timers 13 from operating at both terminals, in a manner which will be described hereinafter in the detailed description of the circuit. The on-line selector 14 at the "east" terminal monitors received signals, and as long as these contain normal "stop" pulses, no further action will occur. Traffic will be recorded by the "east" receiving printer (or reperforator) 15.

During an idle circuit condition, the timers 13 will, when traffic ceases, begin operation, measuring predetermined intervals such as for example, three seconds. After about two seconds, the timer 13 at the "west" terminal will open the transmitter control circuit so that if new tape were subsequently put in the transmitter-distributor, it cannot be read until after a "test" pattern is sent. After three seconds, the "west" pattern distributor 16 will be energized for one cycle, sending the "test" pattern character. The appearance of the "test" character on the line will cause the "west" timer to recycle, closing the transmitter control circuit and allowing traffic to be sent if tape has been meanwhile inserted in the reader. Each transmitter character will then reset the timer, preventing further sending of the "test" signal until the tape is spent. At the "east" terminal, the cessation of traffic will premit the timer 13 to start its cycle. After about two and one-half seconds, the timer will blind (prevent printing at) the receiving printer (or reperforator) 15 in anticipation of reception of the "test" character. The timer will be reset or restored to normal by the pattern, starting a new cycle. If no new traffic appears, it will again blind the printer after another two and one-half seconds. The "east" selector will read the "test" character, and if found to be satisfactory, will permit similar "test" patterns to be sent via the associated control panel 17 through the sending section (shown in dotted lines) at the "east" terminal, if the west bound circuit were also idle. The timing of patterns sent in the two directions is not closely related.

A brief résumé of the present system upon the occurrence of circuit failures will now be given. Loss of one or more "stop" pulses during normal traffic, or an errored "test" pattern character, will be detected by the "east" selector 14, energizing circuitry in the control panel 17 which will immediately open the "east" transmitter-distributor control circuit and set up a "stop" pattern permutation (reverse of "test" character) to be transmitted by the "east" pattern transmitter after the normal three second interval ensuing. Reception of the "stop" pattern at the "west" terminal will immediately open its transmitter control circuit, stopping any moving east bound traffic. After three seconds, the "west" pattern transmitter-distributor 16 will send a "test" pattern, testing the east bound circuit condition. If the pattern is received satisfactorily by the "east" selector 14, the control panel 17 circuitry will be released, causing the next west bound pattern to be a "test" signal. The "east" transmitter control circuit will then be reclosed, allowing west bound traffic to resume. Reception of the "test" signal at the "west" terminal will in turn allow the releasing of its transmitter control circuit, thus permitting the stopped traffic to also restart. Failure of the east bound circuit to the steady "spacing" or open line condition would provide a similar stopping action (loss of "stop" pulses) as above, which will continue until the trouble is cleared. However, failure to "marking" will cause a slightly different sequence. Now, no signals will be received for an extended interval, and the "east" timer will not be recycled after three seconds. Instead, it will continue timing, and at the end of two or three additional seconds will trip the control panel 17 circuits to send a periodic "stop" pattern to the "west" terminal until the trouble can be cleared. Subsequently, the appearance of the east bound "test" signal will permit the restarting of the circuit.

As a further safeguard during the continuous transmission of traffic, the automatic timer 13 at the "west" terminal will also function to cause the transmission of "test" patterns at approximately thirty second intervals, through the interruption of the transmitter control circuit for a three second interval. Reception of said pattern will reset the timer 13 at the "east" terminal, while failure of the pattern to appear after thirty-five or forty seconds will cause the associated "east" terminal control panel 17 circuits to send the periodic "stop" pattern to the "west" terminal.

Certain alarm circuits are contemplated in the present system, located in an alarm panel 18. For example, the sending equipment at a terminal station will have circuitry to detect the failure of a transmitter-distributor to start when its control circuit is closed, or the failure of the pattern transmitter to generate start-stop signals when it should (for example, motor off, shorted contacts, etc.). The timer will record a period of substantially five or six seconds without resetting (restoring), and then sound the alarm. The failure to insert the occasional "test" pattern during busy conditions will send a similar alarm after about forty seconds. A slow-to-release relay will detect an "open" line condition and sound a similar alarm. At the receiving terminal, alarms will be sounded by the reception of a "stop" pattern if the pattern is errored, or if the pattern selecting equipment fails to operate. The failure of the printer or reperforator to cycle or feed paper or tape, a ribbon jam, or an out-of-tape condition, would also sound alarms. If desired, these latter alarms can also cause transmission to be stopped at the distant terminal until the trouble is cleared.

A manual transmitter control switch 19 is also provided. Under conditions of poor reception, or when replacing paper, tape, or ribbon at a receiving station, it may be desirable to stop the distant terminal's transmission. The manual switch 19 thus serves, when operated, to cause outbound transmission to be interrupted for the sending of one or more "stop" patterns, following which, if desired, transmission may resume. When the difficulty is corrected, the switch 19 will be restored to normal, after interrupting traffic long enough to send a "test" pattern that will restart the distant station.

In connection with the choice of pattern signals, it will be noted that pairs of permutation codes which are complementary, such as R and Y, or G and S, will be used. The characters Blank, T, O, M, V And Letters, which could occur as a result of a short "line break," should not be used for a "test" pattern, but T, O, M and V may be used for a "stop" pattern. Different circuits should have different pairs of permutations, so that an error in patching at a switchboard, or in radio tuning, would be immediately detected.

In the following detailed description of the circuitry, shown in Figs. 2 and 3, the signal transmission circuit will be described first. The tape transmitter 11 (transmitter-distributor) comprises a set of tape sensing pins 21 (five or six, for example), a tape-out pin 22, a set of transmitting contacts 23, a clutch magnet 24 and a taut tape switch arm 25. The transmitter 11 may be of the type disclosed in United States Patent No. 2,296,-845. In Fig. 2, a tape 26 is shown introduced in the transmitter 11. Under this "tape-in" condition, a contact 28 attached to the tape-out pin 22 is closed, and with the tape 26 in a slack condition a contact 29 attached to the taut tape-arm 25 is also closed, thereby completing an energizing circuit for the clutch magnet 24 extending from positive battery 31, over conductor 32, through the winding of magnet 24, over conductor 33, over taut tape switch arm 25, through taut tape contact 29 (now closed), through tape-out contact 28 (now closed), over conductor 34, through "pause" timing contact 35 (now closed), over conductor 36, through the winding of "transmitter failure" relay 37, over conductor 38, through "busy" timing contact 39 (now closed), over conductor 41 to junction 42, then through contact 43 (now closed), of "send-stop" relay 44, over conductor 45, through contact 46 (now closed) and switch arm 47 of the manual transmitter control switch 19, over conductor 48, and through contact 49 (now closed) of "receive-stop" relay 51 to negative battery.

While clutch magnet 24 remains operated, the operating shaft (not shown) in the transmitter 11 continues to rotate thereby effecting cyclically the sensing or reading of the tape 26 by the sensing pins 21, thereby closing the contacts 52 (only one shown) permutably. The transmitting contacts 23 and "start-stop" contact 53 are closed sequentially in well known manner to effect transmission of the signal impulses over the signal line, extending from positive battery 54, over conductor 55, through start-stop contact 53 (or one of the tape pin controlled contacts 52 and intelligence pulse contacts 23 in series), over conductor 57, through the winding of line relay 58, over conductor 59, through start-stop contact 61 of the pattern distributor 16, over line conductor 12, and through the winding of a receiving line relay 63 to negative battery.

The line relay 63, through its contact 64, functions to impress signals, corresponding to the received signals, on the conductor 65, to thereby energize the selector magnet 66 of the "on-line" selector 14 over an obvious circuit, and also the selector magnet 67 of the printer (or reperforator) 15 over a circuit extending from positive battery, through the winding of selector magnet 67, over conductor 68, through contact 69 (now closed) of blinding or suppression relay 71, over conductor 65, and through contact 64 (when closed) to negative battery.

It is noted that the line relay 58 is provided with an armature 72 operable between a pair of contacts 73 and 74. The contact 73 is included in the circuit of a timer reset magnet 75, while the contact 74 is included in the circuit of an open line alarm relay 76. In response to each spacing signal (whereby line relay 58 is momentarily de-energized) the contact 73 will be closed to effect the energization of the reset magnet 75 over an obvious circuit. Each time this occurs, the timer comprising cams 77, 78, 79 and 81 mounted on shaft 82 is reset to zero. Thus, with continuous marking on the line, the contact 73 will remain open, and the magnet 75 will remain de-energized thereby permitting the timer to operate, as will presently appear.

The operation of the sending terminal of the system during idle periods will now be described. With no tape in the transmitter 11, transmission ceases. The last spacing impulse delivered by the transmitter 11 to the line relay 58 caused the timer reset magnet 75 (hereinafter called the "pause" timer) to be energized, resetting or restoring the timer to its zero position. Then with the resumption of continuous marking current on the line (closed line condition), the timer cam rotation begins, and after approximately two seconds (the time interval may differ, according to the desired performance of the system) the contact 35 associated with cam 79 is opened to break the circuit previously traced for energizing the clutch magnet 24 of transmitter 11 thereby stopping transmission therefrom.

After about another second, the contact 83 associated with cam 78 is closed, thereby energizing the clutch magnet 84 of the pattern distributor 16 over a circuit extending from positive battery 85, over conductor 86, through the winding of magnet 84, over conductor 87, through the contact 83 (while closed) and over conductor 88 to negative battery 89. The pattern distributor 16 proceeds to transmit, through its transmitting contacts 91, a test pattern character in accordance with the permutation set up in the "R" contacts 92, or the "Y" contacts 93, of the "send-stop" relay 44. Accordingly, the signal line now extends from positive battery 54, over conductor 55, through start-stop contact 53 (now closed), over conductor 57, through winding of line relay 58, over conductor 59 to junction 94, over conductor 95, through "R" contacts 92 (now closed), over individual conductors 96, through sequentially closed contacts 91, over signal line conductor 12 and through winding of the receiving line relay 63 to negative battery. The spacing impulses in the pattern signal are detected by the line relay 58, which in turn, through magnet 75, trips the resetting or restoring device, thereby initiating a new timing cycle. The transmitter clutch circuit (for clutch magnet 24) is reclosed at contact 35 (associated with cam 79), but if no traffic has appeared the circuit for said magnet 24 is open at the taut-tape contact 29 or the tape-out contact 28 so that the pattern cycle is repeated. This condition continues until traffic is again available.

As aforementioned, patterns set up by the "send-stop" or pattern controlling relay 44 consist of complementary pairs of permutations, such as the "R" and "Y." One of said signals in each pair being the "test" signal, and the other being the "stop" signal.

The operation of the system during busy periods; that is, periods of traffic, will now be described. When traffic appears at the local transmitter 11; for example, when tape 26 is placed in the transmitter 11, thereby closing the taut-tape contact 29 and closing the tape-out contacts 28, the circuit for the transmitter clutch 24 will be closed. The next time the cam 79 closes its contact 35, after the transmission of a pattern signal, the transmitter clutch magnet 24 will be energized and transmission of traffic continues, the line relay 58 will cause the "pause" timer reset magnet 75 to be pulsed at irregular intervals (determined by the appearances of spacing impulses) thereby continuously resetting (or restoring) the timer to zero. At regular intervals, however, infrequent enough so as not to seriously impede the flow of traffic, a "busy" timer cam 97 opens the contact 39 to open the circuit for the transmitter clutch magnet 24 long enough to permit the transmission of a circuit testing pattern character through the "R" contacts 92 of relay 44, after which traffic is then resumed and continues under these same conditions (controlled by the "busy" timer cam 97) until the tape 26 is expended (that is, the supply of tape is exhausted, opening contact 28, or taut tape arm 25 causes the opening of contact 29). The "busy" timer is shown without a resetting or restoring mechanism, since it may rotate continuously at a predetermined speed, for example, to close contact 35 once in each thirty seconds. Alternately it could have a clutch magnet similar to magnet 75 of the pause timer and be reset at each pause in transmission at the thirty second intervals timed by itself, thereby permitting a full period of transmission before the first pause would occur.

Under certain other operating conditions, the transmitter portion of the present system operates in the following manner: If a failure is recorded by the the local receiving equipment, the "receive-failure" relay 98 in the receiving portion of the system according to the invention, will operate as will hereinafter appear, either momentarily or on a continuous basis, depending upon the type of failure. This causes contacts 99 and 101 to close. In response to the closure of contact 99, an energizing circuit for the "send-stop" relay 44 is completed from positive battery 102, through the winding of relay 44, over conductors 103, 104 and 105, and through the contact 99 (now closed) to negative battery 106. Relay 44 locks up, if the impulse is momentary only, over a circuit extending from negative battery 102, through the winding of relay 44, over conductors 103, 104 and 107, through locking contact 108 (now closed) of relay 44, over conductor 109, through normally closed contact 110 (now closed) of a "receive-test" relay 111, over conductor 112 to negative battery 106. The "send-stop" relay 44 thus remains operated until both the "receive-failure" relay 98 is released and the "receive-test" relay 111 is subsequently momentarily operated, as will hereinafter appear, opening the locking circuit of relay 44.

Operation of relay 44 causes its contact 43 to open to break the energizing circuit, previously described, for the transmitter clutch magnet 24, thereby stopping the operation of the transmitter 11, and initiating the timing intervals previously mentioned. During this interval the contacts 93 of the relay 44 are closed thereby controlling the transmission of a "stop" pattern, comprising the "Y" code combination, by the pattern distributor 16; and this pattern is repeated at frequent intervals until the "send-stop" relay 44 is released, as will hereinafter appear, whereupon traffic transmission is resumed.

Pursuant to another condition of operation, reception of a "stop" pattern ("Y" code combination) from the distant station will cause the "receive-stop" relay 51 to become energized, as will presently appear, locking itself up through its own locking contact 113 and a normally closed contact 114 on the "receive-test" relay 111. This locking circuit extends from positive battery 115, through the winding of relay 51, through the locking contact 113 (now closed), over a conductor 116, through contact 114 (still closed), and over conductor 112 to negative battery 106. Prior to the establishment of this condition, the "receive-test" relay 111 may have become de-energized, thereby opening its contacts 110 and releasing the "send-stop" relay 44 and re-establishing the circuit, previously described, for energizing the transmitter clutch magnet 24. To prevent the possible transposition of contacts 92 and 93 of "send-stop" relay 44 during the transmission of a "stop" pattern permutation by pattern distributor 16, thereby producing a faulty pattern, the locking circuit for relay 44 also extends through contact 108, over conductor 109, through junction 27, over conductor 56, to contacts 62 (now closed) on distributor 16, thence to negative battery. The contacts 62 open at the end of the pattern signal, only then allowing relay 44 to be released. Pursuant to the present condition of operation, the "receive-stop" relay 51 opens its contact 49, thereby breaking the energizing circuit for the transmitter clutch magnet 24, stopping traffic transmission and initiating time intervals. The pattern sent in this instance is the one set up by the closure of contacts 92 of the "send-stop" relay 44, and is the 'test" character, unless the "receive-failure" relay 98 has previously been or becomes operated. As long as a "stop" signal continues to be received, transmission will be withheld, and the "test" pattern codes will be transmitted. The appearance of the first subsequent "test" pattern code at the local receiving equipment, with the "receive-failure" relay 98 still released, causes the "receive-test" relay 111 to be momentarily energized, thereby opening its contact 114 and breaking the locking circuit for the "receive-stop" relay 51. Relay 51 is therefore released and its contact 49 is again closed to again establish the energizing circuit, previously described, for the transmitter clutch magnet 24. Transmission of traffic is then resumed.

In an alternate method of releasing the "receive-stop" relay 51, the normally closed contacts 114, shown controlled by the "receive-test" relay 111, may be disassociated from said relay and be instead part of a manually controlled switch or push button. Thus, the station attendant would be required to operate the switch or push button, opening contacts 114 each time relay 51 required releasing. This may be advantageous in those instances wherein it is desirable to back up the tape 26 in transmitter 11 to its initial position before resuming transmission because the circuit failure resulting in the reception of the "stop" signal was of a type to cause the loss of part of the message recorded in the tape.

The manual transmitter control switch 19, previously alluded to, permits several modes of operation. In its normal position "1," the circuits are as described above, In position "2," the circuit for the transmitter clutch magnet 24 is opened at contact 46, thereby preventing the transmission of traffic and causing the sending of a series of "test" or "stop" patterns in accordance with the position of the relay 44. When the switch 19 is in this or other off-normal positions, a lamp 117 is lighted over the circuit extending from negative battery 118, over switch arm 119, through serially connected contacts 121, through lamp 117 to positive battery. In switch position "3," the relay 44 is also energized continuously, causing the transmission of a series of "stop" ("Y" code) patterns over a circuit extending from negative battery 118, over conductor 122, over switch arm 123, through contact 124, over conductors 125 and 103, through winding of relay 44 to positive battery. In switch position "4," the "send-stop" relay 44 will likewise be energized over a circuit extending from negative battery 118, over conductor 122, over switch arm 123, through contact 126, over conductors 127, 125 and 103, through winding of relay 44 to positive battery. The contact 43 in the previously described energizing circuit for transmitter clutch magnet 24 will now be opened. However, said contacts 43 will be by-passed so that traffic can be transmitted from the local transmitter 11 because the energizing circuit for transmitter clutch magnet 24 will now extend from negative battery, through contact 49 (now closed), over conductor 48, over switch arm 47, through contact 129 over conductors 131 and 41, and over the previously described circuit to positive battery 31. This type of operation is abnormal but may be permitted in the instance of inbound circuit equipment trouble when it is known that the outbound circuit is operating satisfactorily. Under these conditions, the "stop" pattern is inserted in the traffic at the thirty-second intervals by the local "busy" timer, exemplified by cam 97, if the channel is busy. Whenever the channel becomes idle, the "stop" pattern is sent at the three second intervals under the control of the "pause" timer cams 78 and 79. The manual transmitter control switch 47 should be operated by stages, permitting one or more "test" or "stop" patterns to be sent, as the case may be, before advancing the switch to either end position. In the event of reception of a "stop" pattern from the distant station, relay 51 will be operated to open contact 49, thereby instantly stopping any outbound traffic transmission.

Alarm circuits are provided at the sending terminal for the protection of all units in the sending equipment, and cover most of the possible trouble conditions. If the transmitter 11 fails to start sending when the circuit for the clutch magnet 24 is closed, the "transmitter-failure" relay 37 will operate after a short delay (slow-to-operate type), closing a circuit from the alarm contact 132 associated with cam 81, over a circuit extending from negative battery, through contact 132 (when closed by cam 81), over conductor 133, through contact 134 (now closed) of relay 37, over conductors 135, 136 and 137, through contact 138 (when closed), through switch arm 139, and through operating winding of bell 141 to positive battery. Since this timer cam 81 is mounted on the shaft 82 which is cycled after each pattern signal, short alarm signals are sounded until the trouble condition is cleared. If a gong is used instead of the bell 141, the circuit includes a chopper 142 which causes the gong to ring periodically, thus calling the attendant to the apparatus immediately in the event the alarm circuit remains closed continuously. A red lamp 143 is included in an obvious circuit in the alarm circuitry, so that a visible signal is also provided. An alarm cut-off switch 144 in the circuit permits the silencing of the gong, by opening contacts 139, while a case of trouble is being cleared. When the switch 144 is in the off-normal position, the red light 143 remains lit as a warning.

With normal traffic going out, the timer, exemplified by magnet 75, resets to zero position continually, so that the contact 132 at cam 81 is usually not closed. However, should the circuit for transmitter clutch 24 close after the timer cam 81 has rotated for approximately a half second, at the time the cam contact 132 closes, transmission would normally immediately begin. The timer would almost instantly reset to zero, opening the circuit at contact 132 before the slow-to-operate relay 37 (transmitter-failure relay) would have time to pull up and close the alarm circuit at contact 134. If the pattern distributor 16 fails to send a pattern within a normal interval after the timer was last reset, cam 77 rotates for another second and closes its contact 145 to complete an alarm circuit extending from negative battery, through contact 145 (when closed), over conductors 146, 136 and 137, through contact 138 (when closed), through switch arm 139 and through bell 141 to positive battery. The cams 77, 78, 79 and 81 will then cease rotating, being restrained by a mechanical stop (not shown) and must be manually reset to re-initiate transmission.

As previously mentioned, open signal line conditions, are detected by the functioning of the slow-to-release relay 76 (open line alarm relay), the energizing circuit for which extends from positive battery, through the winding of relay 76, through contact 74 (when closed) to negative battery. Relay 76 normally remains energized when traffic (even a series of "blank signals") is being sent, but releases on a continuous "spacing" signal (open line condition) when contact 74 is open, breaking the energizing circuit for relay 76. Associated with relay 76 is a contact 147 which is normally open. However, when the relay 76 is de-energized to an open line condition, contact 147 closes to complete an alarm circuit extending from negative battery 148, through contact 147, over conductors 149 and 137, through contact 138 (when closed) over switch arm 139 and through bell 141 to positive battery.

The elements of the present system which are provided in the receiving portions of the "west" and "east" terminals are shown in Fig. 3 and a part of Fig. 2. For example, as previously alluded to, these consist of a traffic recording reperforator or printer 15, a pattern detecting on-line selector 14, an automatic timer exemplified by magnet 151, blinding circuits for the reperforator or printer exemplified by relay 71, receiving relays 51, 98 and 111, and miscellaneous alarm circuits.

The operation of the system at the receiving terminal during idle periods will now be described. The line relay 63 delivers, through contact 64, received signals to the on-line selector magnet 66, and also to the printer unit 15, through the contact 69 of blinding relay 71. The timer in Fig. 3 is exemplified by the reset magnet 151 and the timing cams 152 and 153 mounted on a shaft 154. The last character received over the line by the selector 14 causes the timer to be reset to the zero position through the periodic closure of a contact 155 by cam 156 (attached to selector cam, not shown) over an obvious circuit approximately in unison with the timer at the sending station. During the ensuing idle period, the timer cam 152 rotates, and after the elapse of an interval of approximately two and one-half seconds during which the distant transmitter 11 could have started to send, cam 152 closes its contact 157. This completes a circuit to the blinding relay 71 extending from positive battery, through the winding of relay 71, over conductor 158, over switch arm 159, of a manual switch 160, over conductor 161, and through contact 157 (when closed) to negative battery. Relay 71 operates to disconnect the reperforator or printer 15 from the receiving circuit by the opening of contact 69 therein. However, a make before break contact is associated with the relay 71, whereby the contact 162 is closed before the contact 69 is opened, so that there will be no interruption in the steady marking signal to the reperforator or printer 15. Shortly after the blinding relay 71 operates, the pattern character is received from the distant station. The on-line selector 14 operates cyclically, causing the timer to be reset by closing contact 155 thereby releasing the blinding relay 71 by opening the contact 157 and permitting traffic to be recorded on printer 15, if such is subsequently received over the circuit. The timing of contact 155 is such that the pattern character will be completely received by selector 14 before blinding relay 71 releases, so that the pattern character will not appear in traffic copy recorded by printer or perforator 15. If no traffic appears, the cycle of alternate blinding and unblinding takes place continuously, as long as the circuit is idle.

The on-line selector 14 is provided with a set of reading contacts 163, so connected or tied in series as to complete an operating circuit for the "receive-test" relay 111 in response to the reception of the "test" pattern ("R" code, in the present system). Similarly, a set of contacts 164 is also provided, which are so connected in series as to complete an operating circuit for the "receive-stop" relay 51 in response to the reception of the "stop" pattern ("Y" code). Thus, the on-line selector 14 records the permutation of the pattern characters in its contacts 163 or 164, which are set up or closed shortly after the final impulse of the character arrives. The selection which is set up on the contacts 163 or 164 is then read out by the contact 165 associated with timing cam 166, which contact 165 is in series with the contact 157 associated with timer cam 152.

Therefore, if the pattern received is a normal "test" signal ("R" code, impulses 2 and 4 marking), a circuit for the energization of "receive-test" relay 111 is completed from positive battery, through the winding of relay 111 (Fig. 2), over conductor 167 (Figs. 2 and 3), through contacts 163 (when set for "R" code), over conductor 168, through timing contact 165 (when closed), over conductor 169, and through timing contact 157 (when closed) to negative battery. Similarly, if the pattern received is a normal "stop" signal ("Y" code, impulses 1, 3 and 5 marking), a circuit for the energization of "receive-stop" relay 51 is completed from positive battery, through the winding of relay 51 (Fig. 2), over conductor 171 (Figs. 2 and 3), through contacts 164 (when set for "Y" code), over conductor 168, through timing contact 165 (when closed), over conductor 169, and through timing contact 157 (when closed) to negative battery. Thus, either relay 51 or 111 will be pulsed momentarily, causing operation as described hereinbefore within the associated sending equipment.

The operation at the receiving station during busy periods will now be described. When traffic is received from the distant station, the on-line selector 14 operates continuously, resetting the timer, through contact 155, once per cycle. The reperforator or printer 15 records all of the traffic. The infrequent pattern inserted at the distant transmitting station under the control of the "busy timer" 97, as previously described, is read in the normal manner by contacts 163 or 164 on the on-line selector 14 with the reperforator or printer 15 being momentarily blinded.

The operation at the receiving station upon reception of an inbound failure will now be described. The on-line selector 14, during receipt of traffic, also reads for lost or unduly shortened stop impulses in the start-stop signals. It also detects open signal line conditions. Contact 172 associated with cam 173 is closed momentarily just after the selector cam (not shown) starts moving or rotating (in well known manner) upon the reception of a start impulse. Contact 174 associated with cam 175 closes momentarily just after the No. 5 impulse is received, being driven by a separate clutch attached to the main selector shaft 176, which clutch is released near the center of the start-stop character selecting interval. Should a stop impulse be seriously distorted or absent, cam 173 will close its contact 172 immediately after reception of the No. 5 code impulse, simultaneously with the closing of contact 174 by cam 175. A circuit for energizing the "receive-failure" relay 98 is thus completed from negative battery, through contact 174 (when closed), over conductor 177, through contact 172 (when closed), over conductor 178 to junction 179, over conductor 181, and through the winding of relay 98 (Fig. 2) to positive battery. Relay 98 is thus energized long enough to operate and lock up the "send-stop" relay 44, over previously described circuits. The contact 101 of relay 98 is closed to complete an alarm circuit extending from negative battery, through contact 101 (now closed), over conductor 182, then through the lamp 143 to positive battery, and also through contact 138 (when closed), over switch arm 139 and through bell 141 to positive battery. Thus, the alarm gong will be sounded at least once, and the traffic in the outbound circuit will be interrupted, with a "stop" pattern being transmitted through contacts 93 (now closed) at the receiving station. When the distant sending station ceases transmission, it returns a pattern signal which is scrutinized by the selector circuits, thereby checking the reliability of the inbound traffic path. The reception of a good "test" pattern operates the "receive-test" relay 111, opening the locking circuit to "send-stop" relay 44, thus permitting the latter to be released, restoring the circuit immediately to normal operation in both directions.

Referring to Fig. 3, the predetermined series circuits R and Y, through contacts 163 and 164 function to permit the energization of relays 51 or 111. It is noted that the contacts 163 and 164 are also so wired as to establish a circuit for relay 98, in the event the setting of contacts 163 and 164 is other than the "R" or "Y" code. Therefore, if the pattern is improperly received, that is, if the "R" ("test" pattern) or "Y" ("stop" pattern) codes are not received, indicating a telegraph circuit failure, the selector contacts 163 and 164 close in one of the aforementioned other circuits which cause the operation of the "receive-failure" relay 98 over a circuit extending from positive battery, through the winding of relay 98, over conductors 181, 183 and 184 to junction 185, then over conductor 186 and through any of the serially closed contacts 163 and 164 (other than the "R" or "Y" codes), over conductor 168, through contact 165 (when closed), over conductor 169 and through contact 157 (when closed), to negative battery. This stops transmission, sounds an alarm and tests circuit conditions, as previously described.

It may be recognized that with the multiple selector contacts 163 and 164 connected in their serial pattern, a failure of one contact to properly close could leave the circuits to relays 51, 98, and 111 open, thereby preventing the recording of the reception of the pattern signal or its failure. A circuit is provided to insure that such condition invariably causes the operation of the "receive-failure" relay 98. This circuit originates at negative battery at contact 157 associated with cam 152, which contact is closed only at the time of pattern read-out. From contact 157 it extends over conductor 169 to junction 150, thence over conductor 140 to contact 130 (now closed) associated with cam 156, thence over conductor 128 to contact 120 (now closed) associated with relay 51, over conductor 90 to contact 80 (now closed) associated with relay 111, thence over conductor 70 to conductor 181, through the coil of relay 98 to positive battery. The timing of contact 130 is such that it closes after one of relays 51, 98, or 111 could have been operated by the closure of contact 165, but before said relays could again release. Thus, if either relay 51 or 111 were selected, the failure detecting circuit would be open at contact 120 or contact 80. A good selection of relay 98, with both relays 51 and 111 released will result in reapplication of operating current to relay 98 at the time contact 130 closes after the pattern read-out. The closure of contact 130 during the reception of traffic signals will not cause a failure to be recorded, since the circuit will be open at contact 157.

If no pattern ("R" or "Y" code) is received at the time it is due, during an idle period, or if the on-line selector fails to cycle, the timer (exemplified by magnet 151, and cams 152 and 153) rotates beyond its normal bounds, until cam 153 closes its contact 187, thereby completing an energizing circuit for the "receive-failure" relay 98 extending from negative battery, through contact 187 (when closed), over conductors 188, 189, 184, 183 and 181, and through the winding of relay 98 to positive battery. Operation of relay 98 causes traffic to be stopped and an alarm to be sounded, as previously described.

Timer cam 152 closes its contact 157 continuously during each such extended pause in traffic, so that if one pattern is missed the next will cause a normal reset without being recorded in the printer copy. The blinding relay 71 does not break the receiving circuit at contact 162 during the reception of the pattern character, as noted above.

If no pattern is received from the distant terminal or station during a period of continuous traffic reception of, for example, 35 seconds, a "busy timer" cam 191 (Fig. 3) closes its contact 192 and operates the "receive-failure" relay 98 over a circuit extending from negative battery, through contact 192 (when closed), over conductors 193, 194, 189, 184, 183 and 181, through the winding of relay 98 (Fig. 2) to positive battery. The energization of relay 98 sounds an alarm and stops traffic, as previously described. The "busy timer" cam 191 is reset to its zero position each time the blinding relay 71 operates at the time of reception of a pattern, through a circuit from negative battery, through normally open contact 180 on blinding relay 71, through "busy timer" reset magnet 190 to positive battery. Thus, the "busy timer" at the receiving station operates in unison with the "busy timer" at the sending station.

The reception by the east terminal of a "stop" signal from the "west" terminal will now be described. When the received pattern signal consists of the "stop" ("Y" code) permutation, the "receive-stop" relay 51 is energized over the previously described circuit including reading contacts 164 and conductor 171, and locks up over the locking circuit extending from positive battery 115, through the winding of relay 51, through locking contact 113 (now closed), over conductor 116, through contact 114 (now closed), and over conductor 112 to negative battery 106 (Fig. 2). A lamp 195 (Fig. 2) will be lighted (over an obvious circuit) through contact 113 but the alarm gong will not be sounded. The local transmitter clutch circuit will be opened at contact 49, thus stopping the transmission of outbound traffic. The "receive-stop" relay 51 remains locked up until a "test" pattern ("R" code) is subsequently received by the on-line selector 14 to operate the "receive-idle" relay 111 to open contact 114 in the locking circuit of relay 51. In the aforementioned alternate method of releasing relay 51, wherein contact 114 is part of a manual switch or push button, said push button or switch must be manually operated to release the relay 51, thereby permitting the attendant to reset the tape being sensed for transmission, should such be necessary. It should be noted that if the "stop" pattern is being continually received, relay 51 will become almost immediately reoperated if an attempt is made to manually release it. With manual release of relay 51, a connection may also be made to the gong 141, whereby operation of relay 51 will provide an audible alarm to the attendant that his attention is required.

Various receiving terminal alarm circuits will now be described. If the reperforator or printer 15 is sluggish or fails to cycle upon the reception of normal traffic, an alarm will be sounded. This is achieved by a circuit through a normally closed contact 196 (Fig. 3) associated with the punch or print cam 197 in the unit 15. Contact 196 is caused to open momentarily, once during each punch or print cycle, and is connected in series with a similar cyclically operated contact 198, controlled by the cam 175 in the on-line selector 14, which closes momentarily during the short interval that the contact 196 is supposed to open. Thus, a malfunctioning of the recording unit 15 that results in nonoperation or mistiming of contact 196, whereby contacts 196 and 198 are closed concurrently, will cause the "receive-failure" relay 98 to be energized over a circuit extending from negative battery, through the contact 196 (now closed), over conductor 199, through contact 198 (now closed concurrently with contact 196), then over conductors 201, 183 and 181, and through the winding of relay 98 to positive battery.

In the event of a tape or paper-out condition in the recording unit 15, a contact 202 therein is closed to complete an alarm circuit extending from negative battery, through contact 202 (when closed), over conductor 203, and through the alarm cut-off switch 144 to either or both the lamp 143 and gong 141. In this instance, traffic is not stopped, since reception can normally continue for a reasonable interval. The manual transmitter control switch 47 can then be operated to send a "stop" pattern while the tape or paper supply is being replenished. Should it be desired to stop traffic automatically on the tape-out signal, the contact 202 could be closed to operate the "receive-failure" relay 98, as is shown by contact 200, which connects by conductor 170 through conductors 194, 189, 184, 183 and 181, to relay 98. Contact 200 may also represent a contact that is closed upon the occurrence of a ribbon, or recording medium (paper or tape) jam in the receiving printer or reperforator.

During periods of inbound circuit failure, it may be desirable to remove the reperforator or printer 15 from the receiving circuit and go on "stand-by" so as not to waste the recording medium. Operation of the manual blind switch 160 continuously energizes the blinding relay 71 over a circuit extending from negative battery, over conductor 204, through contact 205 (now engaged by switch arm 159), over said switch arm 159, over conductor 158, and through the winding of blinding relay 71 to positive battery. The pattern detecting circuit at contact 157 controlled by timer cam 152, however, remains in condition for normal operation. A lamp 206 is lighted, upon the engagement of contact 207 by switch arm 208, as a warning that the switch 160 is in its off-normal position. To further assist the attendant by warning of the restored condition of the circuit when on "stand-by" connection is made whereby audible and visual alarms will be operated upon the receipt of the normal "test" pattern whenever switch 160 is in its off-normal position. This circuit originates at negative battery 106, passes over conductor 112, through contact 209 (now closed) of "receive-test" relay 111, over conductor 211 to terminal 212 of switch 160, over switch arm 213 (now closed) of said switch, over conductor 214 to junction 215, thence over conductor 203 to lamp 143, gong 141, and positive battery at each of the latter.

The routine of starting a circuit equipped with the system according to the present invention will now be described. When starting up a terminal set equipped with the hereindescribed arrangement, switches 47, 144 and 160 thereat are left in their off-normal position. The transmitter control switch 47 is placed in position No. 2, thereby opening the circuit for transmitter clutch magnet 24 at contact 46. It is assumed that the "west" terminal wishes to transmit to the "east" terminal. The timer shafts and selector shafts are set into rotation at the "west" terminal. At this time it is not known whether the "east" station or terminal is in a condition for receiving or transmitting. Tape is inserted in the transmitter 11 at the "west" terminal. The pattern distributor 16 at the "west" terminal will begin to send "test" patterns ("R" code) to test the "east" terminal. If no pattern signals are received from the "east" terminal, the timer cam 153 at the "west" terminal will rotate until it closes its contact 187 to complete an aforedescribed circuit to the "receive-failure" relay 98 at the "west" terminal. "West" relay 98 will then energize and close its contact 99 to complete a circuit for the "send-stop" relay 44 of the "west" terminal, which will close its contacts 93 to thereafter send "stop" pattern signals ("Y" code) through the "west" pattern distributor 16 to the "east" terminal. If the "east" terminal is conditioned for receiving, then its timing shafts begin to rotate, and the "east" on-line selector 14 is also conditioned for operation. The reception of "stop" signals ("Y" code) by the "east" on-line selector 14 will prepare a circuit through reading contacts 164 for operating the "east" "receive-stop" relay 51 which will lock up and break, at its contact 49, the circuit for the "east" transmitter clutch magnet 24 (if it is not already opened at the No. 2 contact position of the "east" switch 47). The "east" "send-stop" relay 44, not having been energized through operation of the "east" "received-failure" relay will cause the transmission, through the "east" pattern transmitter 16 of "test" pattern signals ("R" code) from the "east" to the "west" terminal. Then, when the "west" terminal now receives these "test" signals ("R" code) on its reading contacts 163 of its on-line selector 14, the "west" "receive-test" relay 111 will operate, thereby breaking the locking circuit, previously established through contact 110, of the "west" "send-stop" relay 44, thereby causing "test" pattern signals ("R" code) to be transmitted, through contacts 92 and pattern transmitter 16 of the "west" terminal, to the "east" terminal. The circuits at both the "east" and "west" terminals are now ready for traffic, and the manual transmitter control switches 47, alarm cut-off switches 144 and blinding switches can now be restored to their normal positions (the switch arms of switch 47 being set in the No. 1 position). The operating circuit, as previously described, for the transmitter clutch magnet 24 of the "west" transmitter 11 will now be closed, permitting tape transmission from said transmitter 11.

In the handling of circuit interruptions, the switches can be manipulated in a variety of ways for the covering of different types of failure. For example, if the local receiving unit is in trouble, the distant office can be stopped by manipulation of the transmitter control switch 47 to either the No. 3 or the No. 4 positions. If the outbound circuit is known to be good, traffic can be sent, with the switch in position No. 4. The distant office can stop this traffic at any time by sending a "stop" pattern signal ("Y" code), since the transmitter control circuit originates at the contact 49 of the "receive-stop" relay 51. Similarly, if stray hits occur in either direction, traffic can be stopped and the circuits observed for a short interval. The manual blinding switch 160 may be operated to its off-normal position, if desired, while readjustment or replacement of the receiving circuit is being accomplished.

Although a preferred form of the invention has been disclosed and described, it is manifest that changes may be made in the details set forth without departing from the essentials of the invention.

What is claimed is:

1. A signal transmission system comprising a plurality of stations, message sending means and message receiving means at each of said stations, a signal channel interconnecting said stations, each of said stations having pattern code signal sending means responsive to cessation of message transmission for automatically inserting and transmitting pattern code signals comprising one or the other of a complementary pair of permutation code signals on said channel in response to predetermined channel conditions, receiving means for receiving said one or the other of said pattern code signals transmitted over said channel, said receiving means comprising sets of reading elements corresponding to said pattern code signals, control means at said stations effective to control said stations in accordance with the setting of said reading elements in response to the pattern code signal impressed on said channel, and alarm means to indicate the condition of said channel.

2. A signal transmission system comprising a plurality of stations, message sending means and message receiving means at each of said stations, a signal channel interconnecting said stations, each of said stations having pattern code signal sending means responsive to cessation of message transmission for automatically inserting and transmitting pattern code signals comprising one or the other of a complementary pair of permutation code signals on said channel in response to predetermined channel conditions, receiving means comprising an on-line selector for receiving said pattern code signals transmitted over said channel, said on-line selector comprising sets of reading elements corresponding to said pattern code signals, control means at said stations effective to control said stations in accordance with the setting of said reading elements in response to the pattern code signals impressed on said channel, and alarm means to indicate the conditionment of said channel.

3. A signal transmission system comprising a plurality of stations, message sending means and message receiving means at each of said stations, a signal channel interconnecting said stations, pattern code signal sending means at each station, timing means associated with said pattern code signal sending means, said timing means responsive to cessation of message transmission from said message sending means for automatically initiating the transmission of pattern code signals comprising one or the other of a complementary pair of permutation code signals on said channel in response to predetermined channel conditions, receiving means for receiving said one or the other of said pattern code signals transmitted over said channel, said receiving means comprising sets of reading elements corresponding to said pattern code signals, control means at said stations effective to control said stations in accordance with the setting of said reading elements in response to the pattern code signals impressed on said channel, and means to indicate the conditionment of said channel.

4. In a telegraph system, a plurality of stations, a duplex transmission path extending between said stations, a storage message transmitter located at each station, a receiving apparatus located at each station, signal sending means at each station, continually operating timing means associated with said signal sending means, said timing means adapted to be reset cyclically to normal during message transmission, control cam means associated with said timing means, said control cam means effective in response to cessation of message transmission from said storage transmitter to automatically initiate the transmission of pattern code signals comprising one or the other of a complementary pair of permutation code signals on said path in response to predetermined conditions thereon, receiving means for receiving said one or the other of said pattern code signals transmitted over said path, said receiving means comprising sets of reading contacts connected serially setwise to correspond to said pattern code signals, and control relay means at said stations effective to control said stations in accordance with the set of reading contacts selected in response to the pattern code signals impressed on said path, whereby the conditionment of said transmission path is indicated.

5. In a telegraph system, a plurality of stations, a duplex transmission path extending between said stations, a storage message transmitter located at each station, a receiving apparatus located at each station, signal sending means at each station, continually operating timing means associated with said signal sending means, said timing means adapted to be reset cyclically to normal during message transmission, control cam means associated with said timing means, said control cam means effective in response to cessation of message transmission from said storage transmitter to automatically initiate the transmission of pattern code signals comprising one or the other of a complementary pair of permutation code signals on said path in response to predetermined conditions thereon, a second timer effective periodically at regularly recurring intervals irrespective of message transmission to automatically initiate operation of said signal sending means, receiving means for receiving said one or the other of said pattern code signals transmitted over said path, said receiving means comprising sets of reading contacts connected serially setwise to correspond to said pattern code signals, and control relay means at said stations effective to control said stations in accordance with the set of reading contacts selected in response to the pattern code signals impressed on said path, whereby the conditionment of said transmission path is indicated.

6. In a telegraph system, a plurality of stations, a duplex transmission path extending between said stations, a storage message transmitter located at each station, a receiving apparatus located at each station, signal sending means at each station, continually operating timing means associated with said signal sending means, said timing means adapted to be reset cyclically to normal during message transmission, control cam means associated with said timing means, said control cam means effective in response to cessation of message transmission from said storage transmitter to automatically initiate the transmission of pattern code signals comprising one or the other of a complementary pair of permutation code signals on said path in response to predetermined conditions thereon, a second timer effective periodically at regularly recurring intervals irrespective of message transmission to automatically initiate operation of said signal sending means, receiving means for receiving said pattern code signals transmitted over said path, said receiving means comprising sets of reading contacts connected serially setwise to correspond to said pattern code signals, control relay means at said stations effective to control said stations in accordance with the setting of reading contacts selected in response to the pattern code signals impressed on said path, whereby the conditionment of said transmission path is indicated, and blinding relay means at the receiving station effective during reception of said test pattern code signals for suppressing recordation by said receiving apparatus.

7. A signal transmission system comprising a plurality of stations, message sending means and message receiving means at each of said stations, a signal channel interconnecting said stations, each of said stations having pattern controlling means for setting up pattern code signals comprising one or the other of a complementary pair of permutation code signals, whereby said one or the other of said complementary pair of permutation code signals are selectively impressed on said channel automatically in response to predetermined channel conditions, means operable independently of said message sending means for transmitting said pattern code signals, receiving means comprising an on-line selector for receiving said pattern code signals transmitted over said channel, said on-line selector including sets of reading elements corresponding to said pattern code signals, and control means at said stations effective to control said stations in accordance with the setting of said reading elements in response to the pattern code signals impressed on said channel.

8. In a telegraph system, a plurality of stations, a duplex transmission path extending between said stations, a storage message transmitter located at each station, a receiving apparatus also located at each station, each of said stations having pattern controlling means responsive to cessation of message transmission from said storage transmitter for setting up pattern code signals comprising one or the other of a complementary pair of permutation code signals, whereby said one or the other of said complementary pair of permutation code signals are selectively impressed on said transmission path automatically in response to predetermined transmission path conditions, means operable independently of said message sending means for transmitting said pattern code signals, receiving means comprising an on-line selector for receiving said pattern code signals transmitted over said path, said on-line selector including sets of reading contacts connected serially setwise to correspond respectively to said complementary pair of permutation code signals, control means at said receiving station for controlling means effective under the control of said control means to alter the pattern code signal transmitted by said pattern code signal sending means.

References Cited in the file of this patent

UNITED STATES PATENTS

| | | |
|---|---|---|
| 2,121,163 | Robinson | June 21, 1938 |
| 2,193,811 | Blanchard et al. | Mar. 19, 1940 |
| 2,351,014 | Connery et al. | June 13, 1944 |
| 2,353,055 | Marshall | July 4, 1944 |
| 2,354,534 | Mason | July 25, 1944 |
| 2,439,398 | Praizner | Apr. 13, 1948 |
| 2,465,507 | Bacon | Mar. 29, 1949 |